US008963982B2

(12) United States Patent
MacDonald

(10) Patent No.: US 8,963,982 B2
(45) Date of Patent: *Feb. 24, 2015

(54) COMMUNICATION SYSTEM AND METHOD

(75) Inventor: Derek MacDonald, Palo Alto, CA (US)

(73) Assignee: Skype, Dublin (IE)

( * ) Notice: Subject to any disclaimer, the term of this patent is extended or adjusted under 35 U.S.C. 154(b) by 383 days.

This patent is subject to a terminal disclaimer.

(21) Appl. No.: 13/340,508

(22) Filed: Dec. 29, 2011

(65) Prior Publication Data

US 2012/0206553 A1 Aug. 16, 2012

Related U.S. Application Data

(60) Provisional application No. 61/428,945, filed on Dec. 31, 2010.

(51) Int. Cl.
*H04L 12/66* (2006.01)
*H04M 1/253* (2006.01)
(Continued)

(52) U.S. Cl.
CPC ......... *H04M 1/2535* (2013.01); *H04L 65/1069* (2013.01); *H04L 65/1059* (2013.01); *H04R 29/005* (2013.01); *H04R 2420/01* (2013.01)
USPC .... 348/14.01; 345/87; 348/14.02; 348/14.04; 348/14.11; 348/500; 370/252; 370/329; 370/352; 370/395.2; 370/400; 379/90.01; 379/93.21; 379/93.35; 379/202.01; 379/221.01; 386/239; 386/326; 386/353; 455/466; 455/550.1; 709/203; 709/220; 709/224; 709/225; 709/232; 713/323; 715/733; 715/748; 725/106; 725/110

(58) Field of Classification Search
CPC ............ H04L 65/1069; H04M 1/2535; H04N 21/4788
USPC ............. 348/14.01, 14.02, 14.04, 14.11, 500; 370/252, 260, 328, 329, 338, 352, 370/395.2, 400; 379/90.01, 93.21, 202.01, 379/221.01, 93.25; 386/239, 326, 353; 455/466, 550.1; 709/203, 205, 220, 709/224, 225, 232; 713/323; 715/733, 748; 725/110, 106; 345/87

See application file for complete search history.

(56) References Cited

U.S. PATENT DOCUMENTS 6,061,434 A * 5/2000 Corbett ....................... 379/93.35
6,243,129 B1 * 6/2001 Deierling ..................... 725/105
(Continued)

FOREIGN PATENT DOCUMENTS

EP 1475939 11/2004
EP 1592198 11/2005
(Continued)

OTHER PUBLICATIONS

"Bluetooth Profile", downloaded Jun. 28, 2010 from http:/_/en.wikipedia.org/w/index.php?title=Bluetooth_profile&oldid=330823199, accessed Dec. 10, 2009, 9 pages.
(Continued)

*Primary Examiner* — Gerald Gauthier
(74) *Attorney, Agent, or Firm* — Sonia Cooper; Jim Ross; Micky Minhas

(57) ABSTRACT

A method, client application and user terminal, the method including providing a packet-based communication system for conducting voice or video calls over a packet-based network and providing an instance of a client application enabling a first user terminal to access the packet-based communication system. The client application is configured so as when executed on the first terminal to receive an input from multiple different audio and/or video input transducers of the first terminal, to analyze those inputs in relation to one another, and based on that analysis to select at least one audio and/or video input transducer and/or output transducer of the first terminal for use in conducting a voice or video call with a remote user terminal via the packet-based communication system.

23 Claims, 2 Drawing Sheets

(51) Int. Cl.
*H04L 29/06* (2006.01)
*H04R 29/00* (2006.01)

(56) References Cited

U.S. PATENT DOCUMENTS

| | | | |
|---|---|---|---|
| 6,449,284 B1 | 9/2002 | Hagirahim | |
| 6,636,269 B1* | 10/2003 | Baldwin | 348/500 |
| 6,654,722 B1 | 11/2003 | Aldous et al. | |
| 6,904,025 B1 | 6/2005 | Madour et al. | |
| 6,930,661 B2* | 8/2005 | Uchida et al. | 345/87 |
| 6,985,961 B1 | 1/2006 | Ramsayer et al. | |
| 7,039,205 B1 | 5/2006 | Carter et al. | |
| 7,260,186 B2 | 8/2007 | Zhu et al. | |
| 7,301,919 B2 | 11/2007 | Sundquist et al. | |
| 7,526,253 B2 | 4/2009 | Fujioka | |
| 7,673,001 B1 | 3/2010 | Battle et al. | |
| 7,693,133 B2 | 4/2010 | Benco et al. | |
| 7,751,848 B2* | 7/2010 | Vishwanathan et al. | 455/550.1 |
| 7,908,630 B2 | 3/2011 | Crandall et al. | |
| 7,920,690 B2* | 4/2011 | Sylvain | 379/221.01 |
| 7,995,721 B2* | 8/2011 | Gallick et al. | 379/90.01 |
| 8,223,747 B2* | 7/2012 | Yarlagadda et al. | 370/352 |
| 8,249,056 B2* | 8/2012 | Ku | 370/352 |
| 8,369,498 B2* | 2/2013 | Dinka et al. | 379/93.21 |
| 8,407,749 B2* | 3/2013 | McLaughlin et al. | 725/106 |
| 8,413,199 B2* | 4/2013 | Laasik et al. | 725/106 |
| 8,421,839 B2* | 4/2013 | Kert | 348/14.01 |
| 8,451,315 B2 | 5/2013 | Lee | |
| 8,520,050 B2* | 8/2013 | Blackburn et al. | 348/14.01 |
| 2002/0034166 A1 | 3/2002 | Barany et al. | |
| 2003/0023730 A1 | 1/2003 | Wengrovitz et al. | |
| 2003/0058805 A1* | 3/2003 | Meyerson et al. | 370/260 |
| 2003/0177099 A1 | 9/2003 | Gallant et al. | |
| 2004/0083297 A1 | 4/2004 | Gazzetta et al. | |
| 2004/0194146 A1 | 9/2004 | Bates et al. | |
| 2005/0021872 A1 | 1/2005 | Poustchi et al. | |
| 2005/0034079 A1 | 2/2005 | Gunasekar et al. | |
| 2005/0122963 A1 | 6/2005 | Jeon et al. | |
| 2005/0268334 A1 | 12/2005 | Hesselink et al. | |
| 2005/0278778 A1 | 12/2005 | D'Agostino et al. | |
| 2006/0013194 A1 | 1/2006 | Baumann et al. | |
| 2006/0045070 A1 | 3/2006 | Fotta et al. | |
| 2006/0221174 A1 | 10/2006 | Yang et al. | |
| 2007/0091833 A1 | 4/2007 | Bauchot et al. | |
| 2007/0115348 A1 | 5/2007 | Eppel et al. | |
| 2007/0280200 A1 | 12/2007 | Patel | |
| 2007/0286202 A1* | 12/2007 | Dos Remedios et al. | 370/395.2 |
| 2008/0062962 A1* | 3/2008 | Luck et al. | 370/352 |
| 2008/0069069 A1 | 3/2008 | Schessel et al. | |
| 2008/0069087 A1 | 3/2008 | Igoe | |
| 2008/0075240 A1 | 3/2008 | Ramanathan et al. | |
| 2008/0081698 A1 | 4/2008 | Wormald et al. | |
| 2008/0091682 A1 | 4/2008 | Lim | |
| 2008/0094371 A1 | 4/2008 | Forstall et al. | |
| 2008/0157998 A1 | 7/2008 | Zuo et al. | |
| 2008/0182546 A1 | 7/2008 | Wang et al. | |
| 2008/0235587 A1 | 9/2008 | Heie et al. | |
| 2008/0239995 A1 | 10/2008 | Lee et al. | |
| 2009/0017792 A1 | 1/2009 | Matsumoto et al. | |
| 2009/0049190 A1 | 2/2009 | Jiang et al. | |
| 2009/0094684 A1 | 4/2009 | Chinnusamy et al. | |
| 2009/0136016 A1 | 5/2009 | Gornoi et al. | |
| 2009/0168756 A1 | 7/2009 | Kurapati et al. | |
| 2009/0172170 A1 | 7/2009 | Rey | |
| 2009/0175509 A1 | 7/2009 | Gonion et al. | |
| 2009/0177601 A1 | 7/2009 | Huang et al. | |
| 2009/0185792 A1* | 7/2009 | Braunstein et al. | 386/117 |
| 2009/0225750 A1 | 9/2009 | Hawkins | |
| 2009/0232084 A1 | 9/2009 | Li et al. | |
| 2009/0238170 A1 | 9/2009 | Rajan et al. | |
| 2009/0280789 A1 | 11/2009 | Takumo et al. | |
| 2010/0008523 A1 | 1/2010 | Demuynck et al. | |
| 2010/0046731 A1 | 2/2010 | Gisby et al. | |
| 2010/0060715 A1* | 3/2010 | Laasik et al. | 348/14.04 |
| 2011/0021200 A1 | 1/2011 | Yi et al. | |
| 2011/0047282 A1 | 2/2011 | Denman et al. | |
| 2011/0110504 A1 | 5/2011 | Kaal et al. | |
| 2011/0119490 A1 | 5/2011 | Kaal et al. | |
| 2011/0141925 A1* | 6/2011 | Velenko et al. | 370/252 |
| 2011/0177801 A1 | 7/2011 | Heit et al. | |
| 2011/0216671 A1 | 9/2011 | Walley et al. | |
| 2011/0222466 A1 | 9/2011 | Pance et al. | |
| 2011/0242266 A1 | 10/2011 | Blackburn et al. | |
| 2011/0242268 A1* | 10/2011 | Kim et al. | 348/14.04 |
| 2011/0242270 A1 | 10/2011 | Dinka | |
| 2011/0243125 A1 | 10/2011 | Kaal et al. | |
| 2011/0243141 A1 | 10/2011 | Blackburn et al. | |
| 2011/0244955 A1 | 10/2011 | Dinka et al. | |
| 2011/0261143 A1* | 10/2011 | Ponsford | 348/14.02 |
| 2012/0087367 A1* | 4/2012 | Anikin et al. | 370/352 |
| 2012/0105475 A1 | 5/2012 | Tseng | |
| 2012/0169831 A1 | 7/2012 | Nietfeld et al. | |
| 2012/0182988 A1* | 7/2012 | Brenes et al. | 370/352 |
| 2012/0206553 A1* | 8/2012 | MacDonald | 348/14.01 |
| 2012/0207147 A1* | 8/2012 | MacDonald et al. | 370/352 |
| 2013/0136089 A1* | 5/2013 | Gillett et al. | 370/329 |
| 2013/0169736 A1 | 7/2013 | Lindblom | |
| 2013/0230023 A1 | 9/2013 | Gray et al. | |
| 2014/0016608 A1 | 1/2014 | Buer et al. | |
| 2014/0112333 A1 | 4/2014 | Oberle et al. | |

FOREIGN PATENT DOCUMENTS

| | | |
|---|---|---|
| EP | 1816843 | 8/2007 |
| EP | 1909467 | 4/2008 |
| EP | 2063612 | 5/2009 |
| EP | 2088735 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO-2005008524 | 1/2005 |
| WO | WO-2005009019 | 1/2005 |
| WO | WO2005009019 | 1/2005 |
| WO | WO-2006051492 | 5/2006 |
| WO | WO-2006058036 | 6/2006 |
| WO | WO-2007023208 | 3/2007 |
| WO | WO-2007137485 | 6/2007 |
| WO | WO-2007118250 | 10/2007 |
| WO | WO-2007126652 | 11/2007 |
| WO | WO-2008015369 | 2/2008 |
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |
| WO | WO-2010026194 | 3/2010 |
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

"Femtocell", downloaded Jun. 28, 2010 from http://en.wikipedia.org/w/iindex.php?title=Femtocell&oldid=330068819, accessed Dec. 10, 2009, (Dec. 6, 2009), 8 pages.
"Final Office Action", U.S. Appl. No. 12/843,543, (Aug. 3, 2012), 8 pages.
"International Search Report and Written Opinion", Application No. PCT/EP2011/054781, (May 23, 2011), 13 pages.
"International Search Report and Written Opinion", Application No. PCT/EP2011/054864, (May 31, 2011), 13 pages.
"International Search Report and Written Opinion", Application No. PCT/EP2011/054862, (Jun. 27, 2011), 17 pages.
"International Search Report and Written Opinion", Application No. PCT/EP2011/054881, (Jul. 25, 2011), 18 pages.
"International Search Report and Written Opinion", Application No. PCT/EP2010/066562, (Feb. 23, 2011), 11 pages.

(56) References Cited

OTHER PUBLICATIONS

"International Search Report and Written Opinion", Application No. PCT/EP2010/066561, (Sep. 26, 2011), 13 pages.

"International Search Report and Written Opinion", Application No. PCT/EP2011/054879, Jun. 24, 2011), 13 pages.

"IP-DECT", downloaded Jun. 28, 2010 from http://en.wikipedia.org/w/index.phptitle=IPDECT&oldid=322769463, accessed Dec. 10, 2009, (Oct. 29, 2009), 1 page.

"MagicJack Harnesses Femtocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.

"Non-Final Office Action", U.S. Appl. No. 12/290,232, (Jun. 11, 2012), 16 pages.

"Non-Final Office Action", U.S. Appl. No. 12/843,543, (May 29, 2012), 9 pages.

"Non-Final Office Action", U.S. Appl. No. 12/843,569, (Apr. 4, 2012), 13 pages.

"Search Report", Application No. GB1005462.5, (Jul. 28, 2011), 2 pages.

"Search Report", GB Application 0919591.8, (Feb. 23, 2011), 2 pages.

"Search Report", GB Application 0919592.6, (Feb. 24, 2011), 1 page.

"International Search Report", Application No. PCT/EP2011/074304, (Feb. 7, 2012), 3 pages.

"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.

Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.

Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.

"International Search Report and Written Opinion", International Application No. PCT/EP2011/074303, (May 29, 2012), 11 pages.

"PCT Search Report and Written Opinion", Application No. PCT/EP2011/074302, (Mar. 6, 2012), 11 pages.

Saint-Andre, Peter "Streaming XML with Jabber/XMPP", IEEE Internet Computing, vol. 9, No. 5,(Sep. 1, 2005), pp. 82-89.

"PCT Search Report and Written Opinion", Application No. PCT/US2012/072025, (Mar. 26, 2013), 12 pages.

"Extended European Search Report", EP Application No. 12199326.5, Apr. 3, 2013, 6 pages.

"Non-Final Office Action", U.S. Appl. No. 13/340,524, Sep. 2, 2014, 10 pages.

"Non-Final Office Action", U.S. Appl. No. 13/710,041, Jul. 8, 2014, 11 pages.

"Non-Final Office Action", U.S. Appl. No. 13/340,492, Oct. 3, 2014, 14 pages.

"Non-Final Office Action", U.S. Appl. No. 13/752,298, Dec. 19, 2014, 28 pages.

"Notice of Allowance", U.S. Appl. No. 13/710,041, Dec. 8, 2014, 4 pages.

\* cited by examiner

COMMUNICATION SYSTEM AND METHOD

RELATED APPLICATION

This application claims the benefit of U.S. Provisional Application No. 61/428,945, filed on Dec. 31, 2010. The entire teachings of the above application are incorporated herein by reference.

TECHNICAL FIELD

The present invention relates to a communication system and a corresponding method for handling voice and/or video calls when multiple audio or video transducers or terminals are potentially available for use in the call.

BACKGROUND

Communication systems exist which allow a live voice and/or video call to be conducted between two or more end-user terminals over a packet-based network such as the Internet, using a packet-based protocol such as internet protocol (IP). This type of communication is sometimes referred to as "voice over IP" (VoIP) or "video over IP".

To use the communication system, each end user first installs a client application onto a memory of his or her user terminal such that the client application is arranged for execution on a processor of that terminal. To establish a call, one user (the caller) indicates a username of at least one other user (the callee) to the client application. When executed the client application can then control its respective terminal to access a database mapping usernames to IP addresses, and thus uses the indicated username to look up the IP address of the callee. The database may be implemented using either a server or a peer-to-peer (P2P) distributed database, or a combination of the two,. Once the caller's client has retrieved the callee's IP address, it can then use the IP address to request establishment of a live voice and/or video stream between the caller and callee terminals via the Internet or other such packet-based network, thus establishing a call. An authentication procedure is typically also required, which may involve the user providing credentials via the client to be centrally authenticated by a server, and/or may involve the exchange of authentication certificates between the two or more users' client applications according to a P2P type authentication scheme.

In the simple case where each of the end users has only one client application installed on one terminal with only one microphone, one speaker, one webcam and one screen, then the handling of the call is relatively straightforward in this respect.

However, with the increasing prevalence of electronic devices capable of executing communication software, both around the home and in portable devices on the move, then it is possible that the same end user may have multiple instances of the same client application installed on different terminals, and/or that a user may have an instance of the client application installed on a terminal with multiple means of audio and/or video input and/or output, i.e. multiple audio or video transducers. In such cases it may be necessary to consider how to coordinate the operation of the multiple transducers and/or multiple terminals when making or receiving a call, or rather how to best exploit these multiple resources to improve the user's experience of the communication system.

The matter has been explored to some extent in some preceding patent applications: U.S. application Ser. No. 12/824,681, corresponding to Great Britain Application No. 1005386.6; U.S. application Ser. No. 12/843,527, corresponding to Great Britain Application No. 1005462.5; and U.S. application Ser. No. 12/941,585, corresponding to Great Britain Application No. 0919592.6.

Further, there are some existing arrangements that provide a remote interface for a call. For example Bluetooth headsets provide an input/output interface that is remote from the phone that handles the call. DECT phones (Digital Enhanced Cordless Telephones) provide handsets that are remote from the base station.

Nonetheless, the inventors believe there is scope to further improve the coordination between the operation of multiple audio or video transducers or terminals for the purpose of making or receiving packet-based calls.

SUMMARY

The present invention provides at least three different aspects, each relating to a communication system, terminal and client application. The communication system is a packet-based communication system such as the Internet and the terminal and client are arranged to conduct the calls via the packet based network using a suitable packet-based protocol such as internet protocol (IP).

According to a first aspect of the present invention, there is provided a communication system, terminal and/or client application configured to receive an input from multiple different audio and/or video input transducers of the same terminal, to analyze said inputs in relation to one another, and based on said analysis to select at least one audio and/or video input transducer and/or output transducer of that terminal for use in conducting a voice or video call.

According to a second aspect of the present invention, there is provided a communication system configured to receive an input from multiple different audio or video input transducers of different terminals of the same user, to analyze said inputs in relation to one another, and based on said analysis to select a suitable one of multiple instances of the client application running on the different terminals for use in conducting a voice or video call. The different instances may be logged in with the same user identity.

According to a third aspect of the present invention there is provided a first user terminal installed with an instance of a client application configured to determine an availability of one or more other secondary user terminals installed with other instances of the client application, and to present the user with an option to select one of said other secondary terminals for use in conducting a voice or video call in conjunction with the first terminal.

The first, second and third aspects of the invention may be used either independently or in combination.

According to the first aspect of the invention, there may be provided a method comprising: providing a packet-based communication system for conducting voice or video calls over a packet-based network; and providing an instance of a client application enabling a first user terminal to access the packet-based communication system, the client application being configured so as when executed on the first terminal to receive an input from multiple different audio and/or video input transducers of the first terminal, to analyze said inputs in relation to one another, and based on said analysis to select at least one audio and/or video input transducer and/or output transducer of the first terminal for use in conducting a voice or video call with a remote user terminal via the packet-based communication system.

In embodiments, the analysis may relate to a relative proximity of a user to the input transducers.

The analysis may comprise a comparison of the energy or power level of the audio input from two or more audio input transducers of the first terminal.

The analysis may comprise a Fourier analysis applied the input from two or more different audio or video inputs of the first terminal.

The analysis may comprise a voice recognition algorithm applied to the audio input from two or more audio input transducers of the first terminal.

The analysis may comprise a facial recognition algorithm applied to the video input from two or more video input transducers of the first terminal The analysis may comprise a motion recognition algorithm applied to the video input from two or more video input transducers of the first terminal.

Said selection may be made upon answering or initiating a call.

Said selection may be made during an ongoing call.

The client application may be configured to recognize voice commands for controlling the call, and said selection may be made based on the analysis of audio inputs received due to one or more voice commands.

The analysis of the inputs from audio input transducers may be used to select an audio input transducer of the first terminal for use in the call.

The analysis of the inputs from audio input transducers may be used to select an audio output transducer of the first terminal for use in the call.

The analysis of the inputs from audio input transducers may be used to select a video input transducer of the first terminal for use in the call.

The analysis of the inputs from audio input transducers may be used to select a video output transducer of the first terminal for use in the call.

The analysis of the inputs from video input transducers may be used to select a video input transducer of the first terminal for use in the call.

The analysis of the inputs from video input transducers may be used to select a video output transducer of the first terminal for use in the call.

The analysis of the inputs from video input transducers may be used to select an audio input transducer of the first terminal for use in the call.

The analysis of the inputs from video input transducers may be used to select an audio output transducer of the first terminal for use in the call.

The client application may be configured to perform an initial calibration process to determine relative input response properties of the different input transducers.

According to another aspect of the invention there may be provided a terminal or system comprising apparatus configured in accordance with any of the above features.

According to another aspect, there may be provided a computer program product comprising code embodied on a non-transient computer-readable medium and configured so as when executed on a processing apparatus to operate in accordance with any of the above features.

BRIEF DESCRIPTION OF THE DRAWINGS

For a better understanding of the present invention and to show how it may be put into effect, reference will be made by way of example to the accompanying drawings in which.

DETAILED DESCRIPTION

The teachings of all patents, published applications and references cited herein are incorporated by reference in their entirety.

Figure 1:
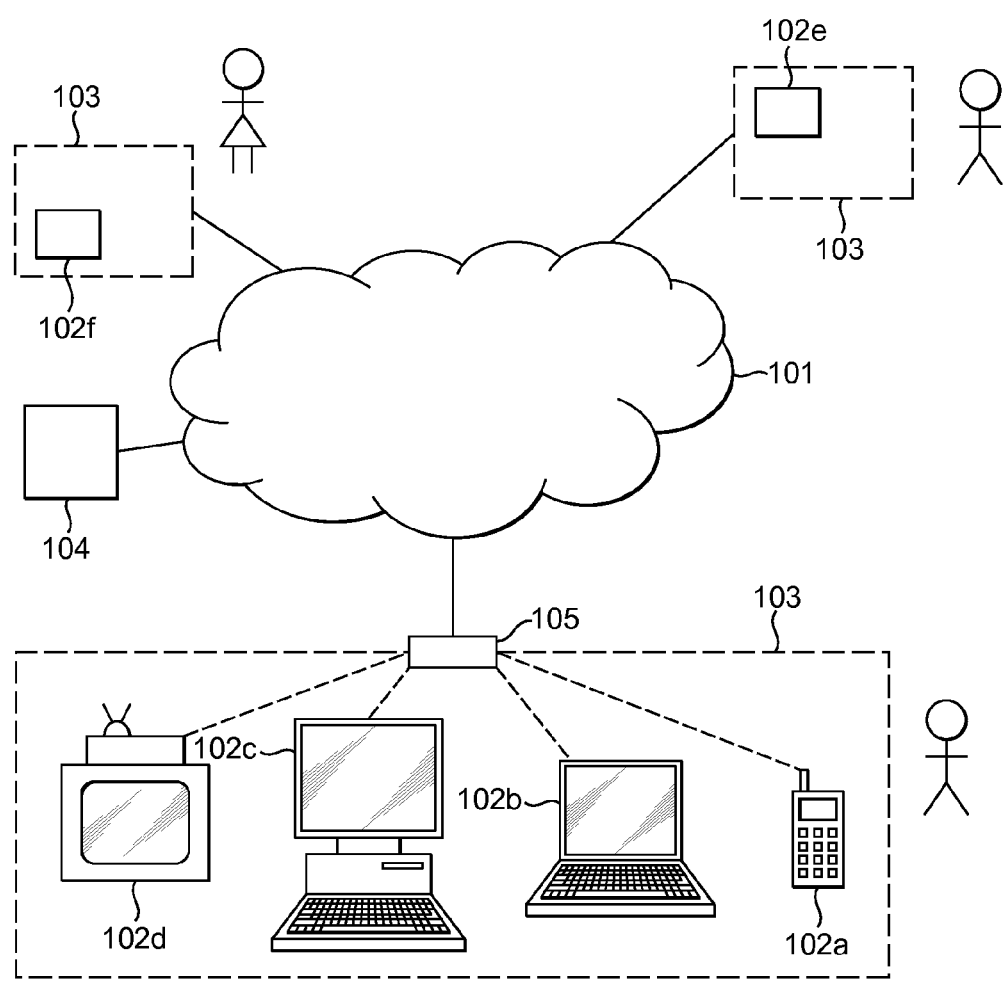
FIG. 1 is a schematic representation of a communication network.

FIG. 1 is a schematic diagram of a communication system implemented over a packet-based network such as the Internet 101. The communication system comprises respective end-user communication apparatus 103 for each of a plurality of users. The communication apparatus 103 of each user is connected to or communicable with the Internet 101 via a suitable transceiver such as a wired or wireless modem. Each communication apparatus 103 comprises at least one user terminal 102. Each terminal 102 is installed with an instance of the client application for accessing the communication system and thereby establishing a live packet-based voice or video call with the client of another user running on another such terminal 102.

Furthermore, in the case of at least one user of the communication system, that user's respective communication apparatus 103 comprises an arrangement or collection of multiple terminals 102. For example, in the illustrative embodiment of FIG. 1 the communication apparatus 103 of one user comprises: a mobile handset type terminal 102a such as a mobile phone, a laptop computer 102b, a desktop computer 102c, and a television set or television with set-top box 102d. Other types of terminal 102 that may be installed with a communication client include photo frames, tablets, car audio systems, printers, home control systems, cameras, or other such household appliances or end-user devices, etc. Each of the multiple terminals 102a-102d of the same user is installed with a respective instance of the communication client application which the same user may be logged into concurrently, i.e. so the same user may be logged into multiple instances of the same client application on two or more different terminals 102a-102d simultaneously. This will be discussed in more detail below.

Each of the different end-user terminals 102a-102d of the same user may be provided with individual connections to the internet 101 and packet-based communication system, and/or some or all of those different terminals 102a-102d may connect via a common router 105 and thus form a local network such as a household network. Either way, it envisaged that in certain preferred embodiments some or all of the different terminals 102a-102d of the same user will be located at different points around the house, e.g. with the television 102d in the living room, the desktop 102c in the study, the laptop 102b open in the kitchen, and the handheld 102a at any other location the user may happen to find themselves (e.g. garden or WC).

Also shown connected to the internet 101 is a data store 104 in the form of either a server, a distributed peer-to-peer database, or a combination of the two. A peer-to-peer database is distributed amongst a plurality of end-user terminals of a plurality of different users, typically including one or more users who are not actually participants of the call. However, this is not the only option and a central server can be used as an alternative or in addition. Either way, the data store 104 is connected so as to be accessible via the internet 101 to each of the client applications or instances of client applications running on each of the terminals 102 of each user's communication apparatus 103. The data store 104 is arranged to provide a mapping of usernames to IP addresses (or other such network addresses) so as to allow the client applications of different users to establish communication channels with one another over the Internet 101 (or other packet-based network) for the purpose of establishing voice or video calls, or indeed other types of communication such as instant messaging (IM) or voicemail.

In the case where the same user can be simultaneously logged in to multiple instances of the same client application on different terminals 102a-102d, in embodiments the data store 104 may be arranged to map the same username (user ID) to all of those multiple instances but also to map a separate sub-identifier (sub-ID) to each particular individual instance. Thus the communication system is capable of distinguishing between the different instances whilst still maintaining a consistent identity for the user within the communication system.

Figure 2:
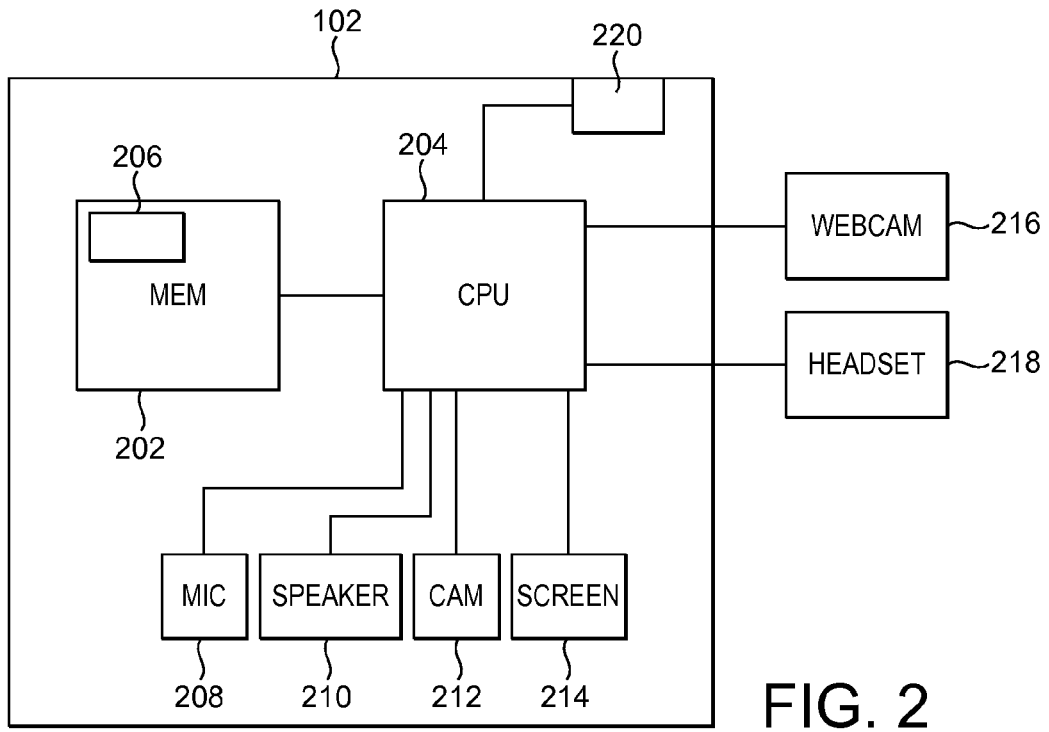
FIG. 2 is a schematic block diagram of a user terminal.
Figure 3:
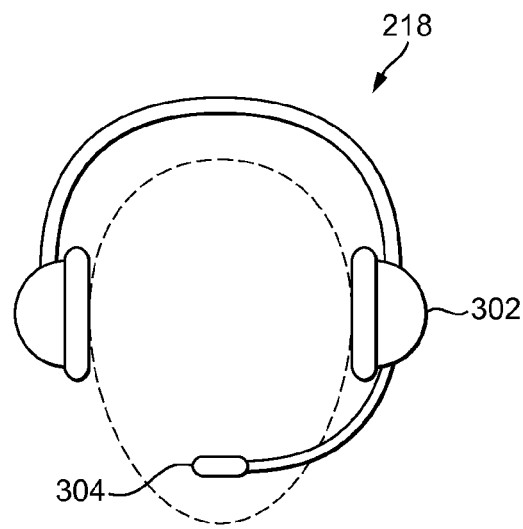
FIG. 3 is a schematic illustration of a headset.

FIG. 2 shows a schematic block diagram of an exemplary end-user terminal 102 according to embodiments of the present invention, which may correspond to any of those mentioned above. The user terminal 102 comprises a memory 202 such as an internal or external hard drive or flash memory, and a processing apparatus 204 in the form of a single or multi core processor. The memory 202 is installed with an instance of the communication client 206, is coupled to the processing apparatus 204, and is arranged such that the communication client 206 can be executed on the processing apparatus 204. The terminal 102 also comprises a transceiver 220 for communicating data on the up and downlink to and from the client 206 via the Internet 101 or other such packet-based network, e.g. a wireless transceiver for wirelessly connecting to the Internet 1010 via the wireless router 105. The terminal 102 further comprises a plurality of AV transducers e.g. an internal microphone 104, an internal speaker 210, an internal camera 212 and a screen 214. The terminal 102 may then also comprise further AV transducers plugged into the main body of the terminal 102, e.g. an external or peripheral webcam 216 and a headset 218. As shown in FIG. 3 the headset 218 preferably comprises an earpiece or headphones 302 and microphone 304 integrated into the same unit.

The term AV transducer may be used herein to refer to any means of audio or video input or output. Terminal is meant as a discrete unit of user equipment whereas a transducer is a component or peripheral of a given terminal. In some situations such as that of a handset and docking station the categorization may not be immediately apparent, but for the purpose of this application a terminal is considered distinct if it executes its own instance of the communication client.

Each of the transducers 208-218 is operatively coupled to the processing apparatus 204 such that the client is able to receive input from any or all of the input transducers 208, 212, 216, 218 and supply outputs to any or all of the output transducers 210, 214, 218. The terminal of FIG. 2 is therefore notable in one respect in that it comprises multiple audio input transducers, multiple audio output transducers and/or multiple video input transducers, and that each of these is potentially available to the client application 206 for conducting voice or video calls over the packet-based network. Multiple video output transducers are also a possibility.

According to a first aspect of the present invention, the client application 206 is configured so as when executed to receive an input from multiple different input transducers of the same terminal 102, to analyze the input signals from the different input transducers in relation to one another, and based on the analysis to select a suitable input transducer and/or output transducer of that terminal for use in conducting a call.

According to a second aspect of the present invention, the instances of the client application 206 on the different terminals 102a-102d of the same user are configured so as when executed to operate in conjunction with one another, to thereby receive an input from input transducers of the different terminals 102a-102d, analyze the input signals from the different terminals 102a-102d in relation to one another, and select a suitable one of the multiple instances of the client application 206 running on different terminals 102a-102d for use in conducting a call. That is to say, the second aspect is concerned not just with the selection of a particular input or output transducer 208-218, but also with the routing of the voice and/or video stream of a call to and from a selected terminal 102a-102d. In this case the terminals 102a-102d together form one end of a call (the "near end") communicating with the client running on a further, third user terminal 102f (the "far end") via the Internet 101 or other such packet-based network.

In either case, the analysis applied to the inputs may include:
  a comparison of the energy or power level of the received audio signal from two or more audio input transducers from the same terminal 102 and/or from different terminals 102;
  comparison of a Fourier analysis of the input signal received from two or more different audio or video inputs from the same terminal and/or different terminals;
  a voice recognition algorithm applied to the received audio signal from two or more audio input transducers from the same terminal 102 and/or from different terminals 102;
  a facial recognition algorithm applied to the received video signal from two or more video input transducers from the same terminal 102 and/or from different terminals 102; and/or
  a motion recognition algorithm applied to the received video signal from two or more video input transducers from the same terminal 102 and/or from different terminals 102.

The client application 206 is arranged to perform one or more such analysis processes and, based on the said analysis, to select one or more of the following for use in conducting the packet-based voice or video call: an input audio transducer, an input video transducer, an output audio transducer, an output video transducer, and/or an instance of the client application running on one of multiple terminals of the same user. This process may be performed upon making a call, answering a call, and/or dynamically during an ongoing call.

For example, in one embodiment the invention may advantageously be used in conjunction with a client 206 or terminal 102 capable of recognizing voice activated commands, e.g. so that the user can control the client 206 vocally with commands such as "call . . . ", "answer call", and "hang up". Depending on the approximate location of a user within a room, or depending on whether or not the user is wearing his or her headset 218, then the optimal microphone for use in making or answering a call may vary. The client 206 may therefore analyze the inputs from two or microphones 208, 304 of the same terminal in the same room to determine which input signal has the largest energy in the human vocal frequency range, e.g. when the user speaks to answer the call using a voice command, and then select that microphone to use in the call.

The audio inputs from the microphones may also determine a suitable audio output transducer, e.g. by selecting between a loudspeaker 210 and the headphones 302 of a headset 218 depending on which microphone is generating the most vocal energy.

In another example, detection of a rustling or scrabbling sound at the headset microphone 304 may be taken as indicative of the user fumbling for their headset to answer an incoming call, and this can be used to select the headset 218 for audio input and/or output.

In yet another embodiment, the audio inputs from the microphones may be used to switch between different audio or video output transducers during the call, e.g. if the user moves around the room or puts on or removes the headset In an example of the second aspect of the invention, it is envisaged that the invention will have an application in situations where the user has different terminals 102a, 102b, etc. located in different places around the house. In this case an analysis of the energy levels from different microphones or cameras of different terminals may be used to determine the presence of the user in a particular room or the proximity to a particular terminal, and hence determine the best terminal for answering or making a call, or to switch between the terminals during an ongoing call as the user roams about the house. Other techniques that can be used to detect the presence or proximity of a particular user include motion estimation to detect the presence of a suitably sized moving object (which may be taken as a human moving between rooms), a Fourier analysis to determine an overall color property of an image or moving object (e.g. based on the assumption that the moving user wears the same color clothes as they move between rooms), or a voice or facial recognition algorithm (to help distinguish between multiple people and/or background noise), or indeed any combination of these.

In the case of the second aspect of the invention, it will be necessary for the client instance 206 on at least one of the terminals to send information about the input received from its respective transducer(s) to one or more other terminals or other network elements for comparison. To achieve this, both (or all) of the user's client instances 206 that are involved in the comparison are preferably logged into with the same username and have the concept of being in the same call.

For example, communication between the instances and/or controller may be enabled by reference to the system of user IDs and sub-IDs mapped to IP addresses or other such network addresses by the data store 104. Thus the list of sub-IDs for each user allows the different client instances to be identified, and the mapping allows a client instance, server or other network element to determine the address of each terminal on which one or more other different instances is running. In this manner it is possible to establish communications between one client and another or between the client and a server or other network element for the purpose of sharing information on the input signals from the audio and/or video input transducers, e.g. to share input energy levels, motion vectors or FFT results. The same mechanism may also be used to signal or negotiate the selection of the required instance for conducting the call.

Alternatively, communication set up may be enabled by maintaining a list of only the terminal identities rather than the corresponding client identities, the list being maintained on an accessible network element for the purpose of address look-up. For example a list of all the different terminals 102a-102d may be maintained on an element of the local home network, 105, 102a-102d, in which case only the local network addresses and terminal identities need be maintained in the list, and a system of IDs and separate sub-IDs would then not necessarily be required. The local list could be stored at each terminal 102a-102d or on a local server of the home network (not shown), and each client instance would be arranged to determine the necessary identities and addresses of the other instances' terminals by accessing the list over the local network.

Once a suitable mechanism has been put in place for identifying the different client instances and the addresses of their respective terminals 102a-102d, the selection may be performed in a number of ways. For example, in one implementation all of the client instances 206 in question may be arranged to transmit their respective transducer input information (e.g. input energy levels, motion vectors or an FFT result) to a central server or other central control element, which could be implemented on a server along with the data store 104 or on an element of the local home network. The central controller would then be arranged to run an algorithm to analyze the different received inputs in relation to one another and thereby select the instance of a particular terminal, e.g. 102b, to make or answer the call. The controller then instructs the instances 206 on their behavior (are they involved in the call or not and to what extent) using the chosen signaling mechanism. In another implementation, the different client instances 206 may share the information directly between each other and either mutually negotiate the selected terminal according to some predetermined protocol or act under the control of one instance that has been designated as the master instance (e.g. by the user or by default).

As mentioned, in some embodiments the analysis of the transducer inputs may be used to switch between different instances of the client 206 running on different terminals 102a, 102b of the same user during an ongoing call, e.g. as the user walks between rooms (rather than just selecting an instance to initiate an outgoing call or answer an incoming call). This may involve each client instance 206 periodically sampling or otherwise monitoring its respective input transducer or transducers 208, 212, 218 and sharing the monitored information throughout the call in a similar manner to that described above. Alternatively each client may only share new transducer input information in response to some detected event such as the input energy level or motion vector exceeding some threshold. Either way, the controller or master instance may thus apply the selection algorithm to the received input information at multiple times throughout the call, in either a scheduled or event-based manner, in order to make an ongoing, dynamic selection as to which instance 206 on which terminal 102 should be used for the call.

In one implementation of the dynamic switching case, once the desired instance has been identified as the selected endpoint for the call, then the switchover may be completed in a similar manner to known call forwarding techniques as described for example in U.S. application Ser. No. 12/290,232 (U.S. Patent Application Publication No. US 2009-0136016), but with the call being transferred between different terminals of the same user based on different sub-IDs, rather than the call being transferred between different users based on different user IDs. In another implementation, the client 206 on the initial terminal, e.g. 102b, may continue to receive the audio and/or video stream of the call but then route the audio and/or video stream onwards to the newly selected terminal, e.g. 102c (such that the endpoint of the call appears to be the same, 102b, from the perspective of the client on the other end of the call). This latter option would be particularly applicable if the initial and new terminals 102b and 102c have a local wireless connection such as a wi-fi or Bluetooth connection available between them.

In both the first and second aspects of the invention, note that the type of transducer being selected is not necessarily the same as the type of transducer used to make the selection. For example, a microphone may indicate the presence of a user in a particular room or location and be used to select a suitably located camera, or a camera may indicate the presence of a user in a particular room or location and be used to select a suitably located microphone, etc.

Further, it is not necessarily the case that the voice and video streams are routed to and from the same user terminals 102a, 120b, etc. In embodiments it could be possible to determine that, say, a television 102d is best placed to display video to the user whilst a laptop 102b or mobile terminal 102a is best placed to handle the audio part of the call. The selection algorithm running on the client instance 206 and/or central controller would then instruct the two streams to be routed to different terminals 102a, 102b.

The first and second aspects of the invention may be used either independently or in combination. For example, it would be possible for the instance of the client application 206 running on each of multiple terminals 102 to determine its own best local input transducer (e.g. highest audio input energy level or best Fourier analysis match), then for the different instances to compare their best local input results to find the best global input result.

In either case, an initial calibration phase may be useful, e.g. to determine the relative levels that the different microphones generate when the user is at different distance from those microphones. That is to say, the client 206 is preferably configured to determine the relative gains of the different microphones. For example upon initial installation the user may be asked to sit or stand at two or more predetermined distances from the terminal and speak at a fixed level, which the client 206 can then use for calibration.

In absence of a clear determination in any of the above examples, the client or system may be configured to use a default transducer and/or terminal for making or answering calls.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention. It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

It will be appreciated that the above embodiments have been described only by way of example. Other variants or implementations may become apparent to a person skilled in the art given the disclosure herein. For example, the invention is not limited by any particular method of resource discovery or authorization, and any of the above-described examples could be used, or indeed others. Further, any of the first, second and/or third aspects of the invention may be implemented either independently or in combination. Where it is referred to a server this is not necessarily intended to limit to a discrete server unit housed within a single housing or located at a single site. Further, where it is referred to an application, this is not necessarily intended to refer to a discrete, stand-alone, separately executable unit of software, but could alternatively refer to any portion of code such as a plug-in or add-on to an existing application. The invention is not limited by the described embodiments but only by the appendant claims.

What is claimed is:

1. A method comprising:
   executing instructions of a client application, for conducting voice or video calls over a communication system, the instructions executable by a processor of a user terminal to perform operations comprising:
   receiving inputs from multiple different audio or video input transducers of the user terminal;
   analyzing the received inputs in relation to one another; and
   responsive to the analyzing, selecting at least one audio input transducer, video input transducer, or output transducer of the user terminal for use in conducting a voice or video call with a remote user terminal via the communication system.

2. The method of claim 1, wherein the analyzing relates to a relative proximity of a user to the input transducers.

3. The method of claim 1, wherein the analyzing comprises comparing the energy or power level of the audio input from two or more audio input transducers of the user terminal.

4. The method of claim 1, wherein the analyzing comprises performing a Fourier analysis of the input from two or more different audio or video inputs of the user terminal.

5. The method of claim 1, wherein the analyzing comprises performing a voice recognition algorithm applied to the audio input from two or more audio input transducers of the user terminal.

6. The method of claim 1, wherein the analyzing comprises performing a facial recognition algorithm applied to the video input from two or more video input transducers of the user terminal.

7. The method of claim 1, wherein the analyzing comprises performing a motion recognition algorithm applied to the video input from two or more video input transducers of the user terminal.

8. The method of claim 1, wherein said selecting is made upon answering or initiating a call.

9. The method of claim 1, wherein said selecting is made during an ongoing call.

10. The method of claim 1, wherein the instructions are executable to perform recognizing voice commands for controlling the call, and said selecting is based on analyzing audio inputs received due to one or more voice commands.

11. The method of claim 1, wherein the analyzing of the inputs from audio input transducers is used to select an audio input transducer of the user terminal for use in the call.

12. The method of claim 1, wherein the analyzing of the inputs from audio input transducers is used to select an audio output transducer of the user terminal for use in the call.

13. The method of claim 1, wherein the analyzing of the inputs from audio input transducers is used to select a video input transducer of the user terminal for use in the call.

14. The method of claim 1, wherein the analyzing of the inputs from audio input transducers is used to select a video output transducer of the user terminal for use in the call.

15. The method of claim 1, wherein the analyzing of the inputs from video input transducers is used to select a video input transducer of the user terminal for use in the call.

16. The method of claim 1, wherein the analyzing of the inputs from video input transducers is used to select a video output transducer of the user terminal for use in the call.

17. The method of claim 1, wherein the analyzing of the inputs from video input transducers is used to select an audio input transducer of the user terminal for use in the call.

18. The method of claim 1, wherein the analyzing of the inputs from video input transducers is used to select an audio output transducer of the user terminal for use in the call.

19. The method of claim 1, wherein the instructions are executable to perform an initial calibration process to determine relative input response properties of the different input transducers.

20. One or more computer-readable storage memories comprising instructions executable by one or more processors of a user terminal of a communication system to perform operations comprising:

receiving inputs from multiple different audio or video input transducers of the user terminal;

analyzing the received inputs in relation to one another; and responsive to the analyzing, selecting at least one audio input transducer, video input transducer, or output transducer of the user terminal for use in conducting a voice or video call with a remote user terminal via the communication system.

21. The one or more computer-readable storage memories of claim 20, wherein the analyzing relates to a relative proximity of a user to the input transducers.

22. A user terminal comprising:

a transceiver operable to access a communication system to conduct voice or video calls over the communication system;

one or more processors operably coupled to the transceiver;

one or more computer-readable memories, coupled to the one or more processors, comprising instructions executable by the one or more processors to perform operations comprising:

receiving inputs from multiple different audio or video input transducers of the user terminal;

analyzing the received inputs in relation to one another; and responsive to the analyzing, selecting at least one audio input transducer, video input transducer, or output transducer of the user terminal for use in conducting a voice or video call with a remote user terminal via the communication system.

23. The user terminal of claim 22, wherein the analyzing relates to a relative proximity of a user to the input transducers.

\* \* \* \* \*